Patented Mar. 28, 1950

2,501,966

UNITED STATES PATENT OFFICE 2,501,966

HALOGENATION OF PEROXIDES

Frederick F. Rust, William E. Vaughan, and Robert W. Wheatcroft, Berkeley, Calif., assignors to Shell Development Company, San Francisco, Calif., a corporation of Delaware No Drawing. Application June 24, 1946, Serial No. 678,894

15 Claims. (Cl. 204—158)

This invention relates to the production of chlorinated and/or brominated organic peroxides. More particularly, the invention provides a practical and economical process for the production of chlorine—and/or bromine-containing organic peroxides by effecting the direct chlor-substitution or direct brom-substitution of the corresponding organic peroxides. Moreover, the invention provides a method of increasing the degree of halogenation of peroxides which already contain halogen substituents.

The process of the invention comprises the direct reaction of an organic peroxide of the general formula $R_1$—O—O—$R_2$, wherein $R_1$ is a tertiary alkyl radical or a chloro-substituted or bromo-substituted tertiary alkyl radical containing at least one replaceable hydrogen atom, and $R_2$ is a hydrocarbon radical, or chloro-substituted or bromo-substituted hydrocarbon radical containing at least one hydrogen atom which is replaceable with chlorine or bromine at a temperature at which substantial chloro-substitution or bromo-substitution of the treated organic peroxide occurs but below the temperature at which substantial decomposition of the organic peroxide reactants and/or products takes place.

A copending patent application of William E. Vaughan and Frederick F. Rust, Serial No. 649,116, filed February 20, 1946, discloses and claims a class of novel halogenated peroxides which may be used, among other things, as polymerization catalysts. The present invention has as its object the preparation of some of these peroxides by a novel and expeditious method.

It has been known in the past to use dialkyl peroxides as polymerization catalysts. However, the peroxides used were those having the alkyl group linked to the peroxy radical by either a primary or a secondary carbon atom, e. g., diethyl or diisopropyl peroxide. Such peroxides are efficient catalysts for effecting polymerization reactions but are liable to explode upon being heated or subjected to shock. For this reason, such peroxides have not found wide commercial application as catalysts for the polymerization of unsaturated compounds. The patent of Vaughan and Rust 2,395,523, issued February 26, 1946, describes a class of dialkyl peroxides which are exceptionally resistant against explosion when subjected to heat or shock. These peroxides have the peroxy radical linked directly to tertiary carbon atoms of the alkyl group and are much more resistant to explosion than those having the linkage to a primary or secondary carbon atom. In the copending application Serial No. 649,116, filed February 20, 1946, mentioned above, an even more explosion resistant class of peroxides is disclosed. These are peroxides having at least one halogen substituent. In addition to possessing exceptional resistance to explosion they have additional advantages. For instance, the halogenated peroxides have lower vapor pressures than the corresponding non-substituted peroxides. Thus they may be used as catalysts at elevated temperatures under circumstances where the corresponding non-substituted compound would cause too great an increase in pressure and further where the non-substituted compound might have such a high vapor pressure that it would be volatilized from the reaction mixture without promoting the desired polymerization reaction. Further, the halogenated peroxides are somewhat less thermally stable than the corresponding non-substituted peroxides so that they may be used as catalysts at lower temperatures.

We have discovered that, contrary to that which would be expected, the alkyl peroxides having at least one tertiary alkyl group linked to the peroxy group may be directly halogenated to yield the corresponding halogenated peroxides. Peroxides are commonly known to behave as both oxidizing and reducing agents; as examples may be cited the intramolecular oxidation-reduction of diethyl peroxide to give ethyl alcohol and acetaldehyde and the corresponding reaction of di-n-propyl peroxide to give n-propyl alcohol and propionaldehyde. Similarly, other oxygenated organic compounds such as alcohols and aldehydes do not react with halogens to form substitution compounds, but oxidize further to form a mixture containing acids and other halogenated compounds. Hence treatment of such a compound with a strong oxidizing agent such as chlorine would be expected to result in ready attack on the molecule and its destruction to give varied products. That this is not the case with tertiary alkyl peroxides, either symmetric or mixed, is quite surprising and unexpected; the chlorine behaves as if one were using it to halogenate substitutionally a paraffinic hydrocarbon.

The peroxides which may be chlorinated and/or brominated according to the present invention have the following general formula:

in which R and $R_1$ represent like or different alkyl radicals which may or may not contain substituent chlorine and/or bromine atoms. A preferred type of peroxide is one in which $R_1$ represents a tertiary alkyl group so that the peroxy group is linked on both sides to tertiary carbon atoms. The two tertiary alkyl groups may be alike or different, but it is preferred to have them both the same.

Typical peroxides which may be chlorinated or brominated according to this invention include: di-tertiary-butyl peroxide, di-tertiary-amyl peroxide, di-tertiary-hexyl peroxide, tertiary-butyl tertiary-amyl peroxide, tertiary-butyl tertiary-hexyl peroxide, methyl tertiary-butyl peroxide, ethyl tertiary-butyl peroxide, isopropyl tertiary-butyl peroxide and the like. Halogenated peroxides may be used as starting materials, such as mono-chlor-di-tertiary-butyl peroxide and mono-chlor-di-amyl peroxide. The method is also applicable to the more complex peroxides such as bis (phenyl dimethyl carbinyl) peroxide, bis (phenyl methyl ethyl carbinyl) peroxide, and bis (ditolyl methyl carbinyl) peroxide.

The reaction between the peroxide and the halogen is ordinarily conducted in the liquid phase and may be done batch-wise or continuously. The reaction may be carried out in the vapor phase with some of the lighter peroxides, particularly at reduced pressures. However, it has been found that liquid phase operation is simpler and gives satisfactory results. Batch operation is ordinarily preferred to continuous operation because it is easier to control the quantities and temperature of the reactants. In the case of the higher boiling peroxides which are viscous or solid at the operating temperature, they may be put into solution with an inert solvent, such as carbon tetrachloride, in order to effect halogenation.

Ordinarily, the peroxide is placed in a reaction vessel and the halogen is bubbled into it. Suitable means may be provided for heating or cooling the reaction vessel. If the reaction is to be catalyzed by light, the vessel should be made of glass or other transparent or translucent material.

It is preferred to catalyze the reaction by means of actinic light. Such light may be from any of the well known sources, such as sunlight, either natural or artificial, incandescent, fluorescent or ultra-violet light. It has been found that the reaction may also be carried out, either in the presence or absence of light, by using a contact catalyst such as $CuBr_2$ or $CuCl_2$ or a halogen carrier such as $PCl_5$ or $S_2Cl_2$.

It is important to select an operating temperature which is sufficiently high to cause the desired substitution to take place but which is not high enough to cause disintegration of the peroxide molecule. When using light as a catalyst, this temperature will be from about 20° C. to 75° C. and it is preferred to operate at a temperature of from about 25° C. to 50° C. When using a contact catalyst or halogen carrier, the temperature may be increased somewhat. The pressure at which the reaction is carried out is not critical and may be atmospheric, subatmospheric or superatmospheric. Generally, it is preferred to operate at atmospheric pressure.

The quantity of halogen which is introduced into the peroxide depends upon the degree of halogenation of the peroxide which is desired. If mono-halogen substituted compounds are desired, the halogen should be in equi-molar quantities, or even less. When it is desired to substitute more than one halogen atom in each molecule, the ratio of halogen to peroxide should be increased. By employing an excess of halogen it is possible to obtain completely substituted peroxides by exhaustive halogenation. While it is ordinarily preferred to have the peroxide halogenated with only a single halogen, that is, either chlorine or bromine, both halogens may be introduced into compounds by successive treatments. To accomplish this, the peroxide is first brominated and the brom-substituted peroxide is chlorinated so as to obtain the desired mixed halogen peroxide.

The invention is also applicable to increasing the degree of halogenation of peroxides which already contain halogen substitutents. Thus, one may use as a starting material a peroxide which has one or more halogen substituents and further halogenate the compound to obtain a peroxide of increased halogen content.

The halogenated peroxides can be recovered from the reaction mixtures and separated by fractional distillation. This is made possible owing to the remarkable stability of the compounds of the invention against explosion. However, it should be understood that it is not necessary to fractionate the product. The unreacted peroxide and halogenated peroxide both behave as effective polymerization catalysts so the reaction mixture may frequently be used without further treatment.

The following illustrative example is given of the method of carrying out the present invention:

*Example*

Chlorine was run into 430.6 grams of di-tertiary-butyl peroxide in the presence of a 500 watt projection lamp until the total weight was 500.7 grams. This amounted to 2.95 moles of the peroxide and 1.98 moles of substituted chlorine. The peroxide was cooled with ice and the chlorine was bubbled into the peroxide at a rate which would maintain the temperature between 30° C. and 40° C. The reaction mixture was distilled to recover the chlorinated products and a yield of 42–43% of monochloroperoxide (based on chlorine input) was obtained. The material distilled at 55° C. under 20 mm. pressure and had a refractive index of $n_D^{20}$ 1.4211.

By continuing the chlorination it has been found possible to obtain substantial yields of di- and tri-chlorinated peroxides.

The dichlorides from several runs performed similar to that described above were combined. The material boiled from 55° C. to 70° C. at 4–5 mm. and had a chlorine content of 33.3% as compared with the theoretical value of 33.0% for the isomers of the following formulas, all of which were probably produced:

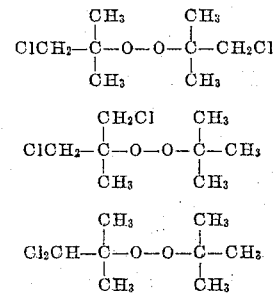

Further fractionation gave two cuts having the following properties, which constituted the largest amount of the product:

45° C.– 50.5° C. at 5 mm. Hg; $n_D^{20}=1.4447$
57° C.– 59° C. at 5 mm. Hg; $n_D^{20}=1.4462$

The lower halogenated hydrocarbon peroxides of the invention are water-white, water-immiscible liquids of pleasant odor. Higher members having larger numbers of carbon atoms or a greater proportion of halogen substitutents are white crystalline solids. In contrast to previously known peroxides having the peroxy radical linked to primary or secondary carbon atoms, the compounds of the invention are remarkably resistant against explosion upon being heated or subjected to shock.

Although either chlorine or bromine may be employed in the present invention, it is preferred to use chlorine.

We claim as our invention:

1. A process for the production of halogenated organic peroxides by the direct halo-substitution of the corresponding organic peroxides containing fewer halogen atoms which comprises reacting an organic peroxide of the general formula:

$$R_1\text{—}O\text{—}O\text{—}R_2$$

wherein $R_1$ is a radical of the group consisting of the tertiary alkyl radicals and the chlorine-substituted and bromine-substituted tertiary alkyl radicals containing at least one replaceable hydrogen atom, and $R_2$ is a radical of the group consisting of the hydrocarbon radicals and the chlorine-substituted and bromine-substituted hydrocarbon radicals containing at least one replaceable hydrogen atom, with a halogen of the group consisting of chlorine and bromine, in the presence of a catalyst, at a temperature at which substantial halo-substitution of the organic peroxide occurs but below the temperature at which substantial decomposition of the organic peroxide reactant and product takes place.

2. A process for the production of halogenated organic peroxides by the direct halo-substitution of the corresponding organic peroxides which comprises reacting an organic peroxide of the general formula:

$$R_1\text{—}O\text{—}O\text{—}R_2$$

wherein $R_1$ is a tertiary alkyl radical containing at least one replaceable hydrogen atom and $R_2$ is a hydrocarbon radical containing at least one replaceable hydrogen atom, with a halogen of the group consisting of chlorine and bromine, in the presence of a catalyst, at a temperature at which substantial halo-substitution of the organic peroxide occurs, but below the temperature at which substantial decomposition of the organic peroxide reactant and product takes place.

3. A process for the production of halogenated organic peroxides which comprises reacting a di-(hydrocarbon) peroxide, wherein at least one of the hydrocarbon radicals linked to the peroxy group is a tertiary alkyl radical, with a halogen of the group consisting of chlorine and bromine, in the presence of a catalyst, and at a temperature at which substantial halo-substitution of the organic peroxide occurs but below the temperature at which substantial decomposition of the organic peroxide reactant and product takes place.

4. A process for the production of the halogenated organic peroxide which comprises reacting a di(tertiary alkyl) peroxide with a halogen of the group consisting of chlorine and bromine, in the presence of a catalyst, and at a temperature at which substantial halo-substitution of the organic peroxide occurs but below the temperature at which substantial decomposition of the organic peroxide reactant and product takes place.

5. A process for the production of halogenated organic peroxides which comprises reacting a di(hydrocarbon) peroxide, wherein at least one of the hydrocarbon radicals linked to the peroxy group is a tertiary alkyl radical, with a halogen of the group consisting of chlorine and bromine, in the presence of a catalyst, at a temperature between 20° C. and 75° C.

6. The process of claim 5 in which the temperature is maintained between 25° C. and 50° C.

7. The process for the production of halogenated organic peroxides which comprises reacting a di(hydrocarbon) peroxide wherein at least one of the hydrocarbon radicals linked to the peroxy group is a tertiary alkyl radical with a halogen of the group consisting of chlorine and bromine in the presence of actinic light, and at a temperature at which substantial halo-substitution of the organic peroxide occurs but below the temperature at which substantial decomposition of the organic peroxide reactant and product takes place.

8. The process for the production of halogenated organic peroxides which comprises reacting a di(hydrocarbon) peroxide wherein at least one of the hydrocarbon radicals linked to the peroxy group is a tertiary alkyl radical with a halogen of the group consisting of chlorine and bromine in the presence of a contact catalyst, and at a temperature at which substantial halo-substitution of the organic peroxide occurs but below the temperature at which substantial decomposition of the organic peroxide reactant and product takes place.

9. The process of claim 8 in which the contact catalyst is chosen from the group consisting of $CuBr_2$ and $CuCl_2$.

10. The process for the production of halogenated organic peroxides which comprises reacting a di(hydrocarbon) peroxide wherein at least one of the hydrocarbon radicals linked to the peroxy group is a tertiary alkyl radical with a halogen of the group consisting of chlorine and bromine in the presence of a halogen carrier, and at a temperature at which substantial halo-substitution of the organic peroxide occurs but below the temperature at which substantial decomposition of the organic peroxide reactant and product takes place.

11. The process of claim 10 in which the halogen carrier is chosen from the group consisting of $PCl_5$ and $S_2Cl_2$.

12. A process for the production of halogenated organic peroxides which comprises reacting a di(hydrocarbon) peroxide wherein at least one of the hydrocarbon radicals linked to the peroxy group is a tertiary alkyl radical with a halogen of a group consisting of chlorine and bromine in the presence of an inert solvent and a catalyst, and at a temperature at which substantial halo-substitution of the organic peroxide occurs but below the temperature at which substantial decomposition of the organic peroxide reactant and product takes place.

13. A process for the production of a mixed halogenated organic peroxide comprising reacting, in the presence of a catalyst, and at a temperature at which substantial halo-substitution of the organic peroxide occurs but below the temperature at which substantial decomposition of the organic peroxide reactant and product takes place an organic peroxide, in which the peroxy group is linked to at least one of the organic radicals by a tertiary carbon atom, with bromine to obtain a bromine substituted peroxide and then reacting said bromine substituted peroxide with chlorine to obtain an organic peroxide having both chlorine and bromine substituents.

14. A process for the production of halogenated organic peroxides which comprises reacting an organic peroxide wherein at least one of the organic radicals linked to the peroxy group is a tertiary alkyl radical with a halogen of the group consisting of chlorine and bromine, in the presence of a catalyst, and at a temperature at which substantial halo-substitution of the organic peroxide occurs but below the temperature at which substantial decomposition of the organic peroxide reactant and product takes place and distilling the reaction mixture thereby produced to recover the halogenated peroxide.

15. A process for the production of chlorinated di-tertiary-butyl peroxide, comprising reacting di-tertiary-butyl peroxide with chlorine in the presence of actinic light at a temperature of from 20° C. to 75° C.

FREDERICK F. RUST.
WILLIAM E. VAUGHAN.
ROBERT W. WHEATCROFT.

REFERENCES CITED

The following references are of record in the file of this patent:

UNITED STATES PATENTS

| Number | Name | Date |
|---|---|---|
| 2,346,568 | Fox | Apr. 11, 1944 |

OTHER REFERENCES

Ellis et al.: Chemical Action of Ultraviolet Rays, 1941, pp. 526–550.